United States Patent
Temme et al.

(10) Patent No.: US 6,316,529 B1
(45) Date of Patent: Nov. 13, 2001

(54) TWO-COMPONENT COATING AGENT BASED ON AN EPOXY RESIN FOR CEMENT-BOUND BACKGROUNDS

(75) Inventors: Werner Temme, Bietingen; Thorsten Pretz, Gaienhofen; Christian Krausche, Stockach, all of (DE)

(73) Assignee: Conica Technik AG, Schaffhausen (CH)

( * ) Notice: Subject to any disclaimer, the term of this patent is extended or adjusted under 35 U.S.C. 154(b) by 0 days.

(21) Appl. No.: 09/466,058

(22) Filed: Dec. 17, 1999

Related U.S. Application Data

(63) Continuation of application No. PCT/EP98/03684, filed on Jun. 18, 1998.

(30) Foreign Application Priority Data

Jun. 20, 1997 (DE) .............................................. 197 26 263

(51) Int. Cl.[7] .............................. C08K 3/10; C08L 63/02
(52) U.S. Cl. .......................... 523/457; 523/459; 523/466
(58) Field of Search ................................... 523/466, 457, 523/459

(56) References Cited

U.S. PATENT DOCUMENTS

| | | | |
|---|---|---|---|
| 4,751,278 | * | 6/1988 | Brytus ..................................... 528/88 |
| 5,192,816 | * | 3/1993 | Iizuha ..................................... 523/463 |
| 5,621,025 | | 4/1997 | Toerner et al. . |

FOREIGN PATENT DOCUMENTS

| | | |
|---|---|---|
| 41 36 943 | 5/1993 | (DE) . |
| 195 26 151 | 1/1997 | (DE) . |
| 19526151 | * 1/1997 | (DE) . |
| 0 709 418 A2 | 5/1996 | (EP) . |
| 98 17724 | 4/1998 | (WO) . |

OTHER PUBLICATIONS

Lee & Neville, Handbook of Epoxy Resins, pp. 23–22, 1967.*
Chemical Abstracts, vol. 86, No. 12, Mar. 21, 1977 Columbus, Ohio US; abstract No. 74649, Fedorova V. V. et al. "Mastic for floors".
Database WPI week 8751 Derwent Publication Ltd., London, GB: AN 87–358764 (1987).

* cited by examiner

*Primary Examiner*—Robert Dawson
*Assistant Examiner*—D. Aylward
(74) *Attorney, Agent, or Firm*—Gary M. Nath; Joshua B. Goldberg; Nath & Associates PLLC

(57) ABSTRACT

The invention relates to a two-component coating agent on an epoxy resin base, comprising a resin component A and a hardener component B, characterized in that the resin component A consists of between (15 and 18) weight percent, in relation to component A, of an epoxy resin and at least one additional component, chosen from among a reactive diluent, a filler, and other ingredients such as pigments, additives and extenders, that the hardener component B consists of between 20 and 50 weight percent, in relation to component B, of m-xylyl endiamine and at least one other component, chosen from among an adductor resin, an extender and an accelerator, and in that components A and B are present at a molar ratio of 1:0.8 to 1.2. The coating agent, which in addition to the two main components can also contain as much as 15 times their weight in aggregates having a particle size of up to 3.0 mm, is used primarily for coating the surfaces of backgrounds subject to strong chemical and/or mechanical stress and for bridging cracks. Coats can be up to 50 mm thick.

17 Claims, No Drawings

TWO-COMPONENT COATING AGENT BASED ON AN EPOXY RESIN FOR CEMENT-BOUND BACKGROUNDS

This application is a Continuation Application of international application PCT/EP98/03684 filed Jun. 18, 1998, the entire contents of which are hereby incorporated in their entirety.

DESCRIPTION

1. Technical Field

The subject matter of the present invention is a two-component coating agent based on epoxy resin that is especially suited for cement-bound backgrounds.

2. State of the Art

In the past, self-leveling, filled and/or pigmented coating materials based on epoxy resin have proven themselves well for the coating of cement-bound backgrounds such as, for example, industrial floors, warehouses and traffic surfaces that are heavily walked or driven upon and walls which are exposed to weathering conditions and/or chemical influences. In particular, the mechanical and chemical resistance can be distinctly increased with coatings of this type.

In this connection, increasing chemical resistance against aggressive gaseous or liquid medium chiefly stands in the fore-ground but also improving crack bridging properties that, above all, should prevent leakiness which is caused by cracks in the background.

Particular demands are placed on the epoxide resin-based coating systems in special fields of application in which regulations are to be observed such as, for example, the Construction and Testing Rules ("Bau- und Prüfungssätze"; BPG) of the German Institute for Civil Engineering. Hence, among others, this regulation for coating systems that are to be used in warehouses in which water-endangering liquids are held requires a static crack bridging capacity of at least 0.2 mm with an as high as possible chemical resistance at the same time. The total resistance of the coatings are tested with special test liquids over a time period of 42 days and under an applied pressure of one bar. The standardized test liquids represent certain groups of possible stock chemicals such as, for example, inorganic bases or acids, organic acids, esters, ketones, alcohols or aromatic hydrocarbons.

In order to meet the posed requirements, various epoxide resin coating systems have been developed which are all composed of several individual layers.

The simplest coating system consists of a primer and an elasticized covering layer; however, this system has only a very limited durability.

After that, systems were developed that possess an intermediate layer between the primer and a rigid, highly cross-linked covering layer which is meant to guarantee the resistance. For crack bridging, this can either be elastic or can consist of a laminate layer with fabric or non-woven inserts.

Only with the multi-layered systems has it been possible up to now to combine the crack bridging capacity with the resistance against certain chemical test groups required by regulations, whereby the quality is still unsatisfactory. In addition, the high price and the extreme laying effort negatively burden the economic efficiency of these systems.

Up to now, mostly coating systems based on epoxide resin have been used which typically contain epoxide resins with a molecular weight <700 g/mol, such as bisphenol A and/or F, reactive diluents and polyamine-based hardener formulations as components. In this connection, the hardener can be pre-added to a certain degree and contains amines such as 3-aminomethyl-3,5,5-trimethyl cyclohexylamine (IPDA), diaminodiphenylmethane (DDM), bis-paraaminocyclohexylmethane (PACM)), 1,3-bis(aminomethyl)cyclohexane(BAC) or triethylenetetramine (TETA).

With coating agents that contain these amines individually or in mixtures, cracks <0.2 mm can be bridged by simultaneously covering a large number of test groups (including solvents) (type A) or cracks $\geq 0.2$ mm, whereby, however, only a small number of test groups (without solvents) are covered (type B). In the later case, extenders (liquid fillers) and/or resins and/or hardeners with long-chained structures are typically added to the coating agents for elastification.

In all, it is to be assumed that coating systems that meet the requirements of DIBT (German Institute for Civil Engineering) test groups 3, 8, 10 to 12 and 14 only have a low resistance; that which fulfils the test groups 1, 2 and 9 meets average demands and high demands are fulfilled by meeting the requirements of the test groups 4 to 7 and 13.

In order to improve the requirement profile of the coating systems, accelerators or highly reactive amines, above all m-xylylenediamine (MXDA), are also added to the epoxide resin mixtures in addition to the above mentioned components. The use of MXDA as a hardener component in mixtures with tertiary amines is also known; however, in these relatively seldom cases which are only limited to special uses, rigid coating materials are always obtained with a high elastic (E) modulus as well as intense embrittlement phenomena in the hardened coating agent as well such that an elastic crack bridging with these MXDA containing hardener mixtures was not possible.

Therefore, the object from the described short-comings of the state of the art was to develop a two-component coating agent based on epoxide resin that guarantees an elastic crack bridging without embrittlement phenomena and, at the same time, has a very high chemical resistance, whereby laminar intermediate layers can be dispensed with for simplified working properties.

SUMMARY OF THE INVENTION

This object was solved with a two-component coating agent based on epoxy resin with a resin component A and a hardener component B, characterized in that the resin component A comprises 15 to 80% by weight, in relation to the component A, of an epoxide resin and at least at one additional component selected from a reactive diluent, a filler, other ingredients such as pigments, additives and extenders, and the hardener component B comprising 20 to 50% by weight, in relation to component B, of m-xylylenediamine and at least one additional component selected from an adductor resin, an extender and an accelerator, and that the components A and B are present in a molar ratio of 1:0.8 to 1.2.

It was completely surprising to find that by maintaining the above quantitative proportions and by exclusive use of m-xylylenediamine as a hardener component and/or by a large excess of MXDA in relation to the total amine content in the hardener, the crack bridging properties can be combined very well with an extremely high chemical resistance. In addition, it was also shown that layer thicknesses of several centimeters can be durably built-up with coatings according to the invention that are possible without the effort associated with installation of floating or laminate layers which was not to be expected to this degree.

BEST MODE FOR CARRYING OUT THE INVENTION

For the effects that are to be achieved by the present invention, it has proven itself favorable when epoxide resins of the type bisphenol A and/or F are preferably used for the resin component A. The amount of epoxide resin can be 15 to 80% by weight, preferably 20 to 60% by weight.

As already mentioned, further components in varying portions can be present in both components A and B of the coating agent according to the invention aside from the main components of epoxide resin and m-xylylenediamine that are essential for the invention.

Thus, it has been proven favorable for certain applications when the reactive diluents are added to the coating agents whereby the viscosity is adjustable and the total chemical resistance of the coating material is controllable, especially in component A. The use of reactive diluents for the preparation of component B positively influences the viscosity of the total hardener component. Typical reactive diluents according to the invention are epoxide group-containing mono-, di- or polyfunctional ethers, preferably of the type hexanediol-, neopentyl diglycol and trimethylolpropane triglycidyl ethers. However, other representatives are considered, for example, cresyl glycidyl ethers, n-dodecyl or n-tetradecyl glycidyl ethers, polypropylene glycol diglycidyl ether, 1,4-butanediol diglycidyl ether or cyclohexane dimethanol diglycidyl ether. If a reactive diluent is contained in component A, its amount is preferably up to 30% by weight, for example, 3 to 20% by weight.

As also mentioned above, large layer thicknesses can be achieved with the present coating agent. In order to realize this in the most economic manner possible, the present invention provides enrichment of component A with fillers that can originate from the series barium sulphate, quartz powder, quartz sand and silicon carbide or other non-reactive suitable materials. Obviously, these can be used in all possible combinations with one another for increasing the volume. When fillers are used, they are preferably used in component A in an amount of up to 70% by weight and are particularly preferably used from 50 to 70% by weight.

Additionally, the invention provides that the resin component A can contain other ingredients such as pigments, additives and extenders that further increase the application possibilities of the coating agent. In contrast to the fillers, which are used as solids according to definition, the so-called extenders concern fluid fillers, for example, in the form of an alcohol such as benzyl alcohol or auxiliary agents which support film formation. However, carbon fibers or fabrics are also regarded as ingredients which must be added to coating agents as so-called conductors if, for example, flammable liquids of the danger classes A1, A2 and B are to be stored. The total amount of ingredients of this type is preferably up to 20% by weight, for example, 12 to 18% by weight, in so far as such ingredients are used.

Decisive for the particular and qualitatively high-standing properties of the coating agents according to the invention is the indispensable presence of m-xylylenediamine as a hardener of which the component B can contain up to 50% by weight, preferably 20 to 40% by weight.

As with component A, component B can also contain further minor components according to the present invention. Preferably, adductor resins are to be named here for which epoxide-containing compounds are particularly suitable that also allow a certain pre-reaction like the reactive diluents. Bisphenol A and/or F have proven themselves as particularly favorable, but the known reactive diluents can also be considered for this. With respect to this pre-reaction, the amine compounds in component B can have an adductor degree of maximally 35% according to the invention. The adductor degree is a measure for the pre-reaction between epoxide resin and hardener. The use of adductor resins in an amount of up to 40% by weight, for example 10 to 40% by weight, is preferred.

However, component B can also contain liquid fillers in the form of extenders for which benzyl alcohol is particularly suitable—like in component A as well; however, xylene formaldehyde condensation products and coal-tar resins in general as well as diisopropyl naphthalene are also considered for components A and B. If such extenders are used, they are preferably present in an amount of 20 to 50% by weight, and are particularly present in the preferred amount of 30 to 45% by weight.

In addition, for formation of the desired properties in the quickest manner possible, an accelerator can be added to component B, preferably in the form tertiary amines; in particular, 2,4,6-trimethyl aminomethyl phenol has proven itself particularly suitable for this purpose. With the aid of tertiary amines, the mechanical properties and the reactivity of the total mass is adjustable within wide boarders without having the excellent properties of the coating agent being limited with respect to crack bridging and resistance. Obviously, the amount added is dependent on the respectively added tertiary amine, however, it should not exceed 10% by weight according to the invention. Useful results are achieved with accelerated amounts from 2 to 6% by weight for example.

Aside from the tertiary amines and the obligatory MXDA, component B can also contain further amines up to 50% by weight, preferably up to 30% by weight, and more preferably up to 15% by weight, in relation to the total amine content. In this connection, the invention preferably considers 3-aminomethyl-3,5,5,-trimethyl cyclohexylamine, 1,3-bis(aminomethyl)cyclohexane, 2,5- or 2,6-bis(aminomethyl)bicyclo(2.2.1)heptane and 1,2-diaminocyclohexane as well as bis-paraaminocyclohexyl methane, triethylenetetramine and diaminodiphenylmethane or mixtures thereof.

In everyday use of the coating agents according to the invention, the use of the components A and B, variously formulated depending on the application, has proven itself particularly favorable in a molar ratio of 1:1.

In this connection, mineral aggregates with a particle size to 3.0 mm can be added to the actual coating agent mixture comprising the components A and B, whereby their amount can altogether constitute up to 15-fold of the total sum of components A+B.

In particular, pre-dried quartz sand, but also all other grainy non-reactive sand and gravel-shaped aggregates are considered in order to increase the internal area of the coating agent and to improve the "interlocking" of the coating agent with the background.

As a result of the excellent product properties, the present invention provides a use of the claimed coating agent, especially for surface coating of mastic asphalt as well as of mechanically and/or strong chemically loadable backgrounds based on cement. According to the invention, the respective coat thickness can be up to 50 mm, but thicknesses between 2 and 4 mm are preferred.

The present coating agents based on epoxide resin are also suitable for a system composition according to paragraph 19 of the German Water Preservation Act, above all, as system components corresponding to the requirements of the LAU (storage-filing-transfer) and HBV (production-treatment-use) fields.

Cracks with widths up to 2 mm can be durably and elastically bridged without problem with the coating agents according to the invention because the desired static crack bridging capacity is variably adjustable by the choice of the suitable coat thickness or by the addition of additional coarse-grained aggregates. However, bridging of wider cracks is also possible through the large variability of the coating agent according to the invention.

The following examples comparatively illustrate the advantages of the coating agents according to the invention:

EXAMPLE

For the following examples, coating agents were selected whose component A has the following standard composition:

| Component A: | Percent by weight |
|---|---|
| Liquid epoxide resin (bisphenol A) | 30.0 |
| Reactive diluent (neopentyl glycol diglycidyl ether) | 3.0 |
| Filler (barium sulfate, quartz powder | 55.0 |
| Pigment iron oxide, titanium dioxide | 5.0 |
| Additive de-aerator and defoamer based on polyacrylate | 1.0 |
| Extender benzyl alcohol | 6.0 |

Component B contained the ingredients respectively given in the following Table. Components A and B were each homogeneously mixed in a molar ratio of 1:1 at temperatures of 20° C. using customary mixing devices such as a dissolver and laboratory agitator and the coating agent was tested corresponding to the construction and testing rules of the German Institute for Civil Engineering (regulations "Regelwerk") with regard to, among others, the parameters static crack bridging and chemical resistance.

The Examples 1 to 6 are comparative examples; the Examples 7 to 9 with MXDA as the sole amine (hardener) component are examples according to the invention.

What is claimed is:

1. A two-component coating agent based on epoxide-resin comprising a resin component A and a hardener component B, characterized in that the resin component A comprises 15 to 80% by weight, in relation to component A, of an epoxide resin and at least one additional component selected from the group consisting of a reactive diluent, a filler, pigments, additives, extenders, and mixtures thereof, the hardener component B comprises of 20 to 50% by weight, in relation to component B, of m-xylylenediamine and at least one further component selected from an adductor resin, an extender and an accelerator, and that the components A and B are present in the molar ration of 1:0.8 to 1.2.

2. Coating agent according to claim 1, characterized in that an epoxide resin of the type bisphenol A and/or F is contained in component A.

3. Coating agent according to claim 1, characterized in that the reactive diluent of component A is selected from the group consisting of an epoxide group-containing mono-, di- and/or polyfunctional ethers, hexanediol, neopentyl diglycol and trimethylolpropane triglycidyl ethers, said diluent being present in an amount of up to 30% by weight.

4. Coating agent according to claim 1, characterized in that said component A contains a filler selected from the group consisting of barium sulphate, quartz powder, quartz sand, silicon carbide and mixtures thereof, said filler being present in an amount of up to 70% by weight.

5. Coating agent according to claim 1, characterized in that the component B contains 25 to 40% by weight m-xylylenediamine.

6. Coating agent according to claim 1, characterized in that the production of component B includes the use of an adductor resin in the form of an epoxide-containing compound based on bisphenol A, bisphenol F, or a reactive diluent, said adductor resin or said reactive diluent being used in an amount of up to 40% by weight.

| | Comparative Examples | | | | | | Invention Examples | | |
|---|---|---|---|---|---|---|---|---|---|
| Component B: | 1 | 2 | 3 | 4 | 5 | 6 | 7 | 8 | 9 |
| Basis amine (hardener) | 35% IPDA | 30% DDM 46% IPDA modified | 35% TETA | 35% PACM | 35% BAC | 35% DCH 99 | 35% MXDA | 35% MXDA | 35% MXDA |
| Extender (benzyl alcohol) | 45% | 18% | 34% | 34% | 34% | 34% | 34% | 33% | 32% |
| Adductor resin (bisphenol A) | 28% | 4% | 28% | 27% | 28% | 28% | 28% | 28% | 28% |
| Accelerator (2,4,6-tri-methyl aminomethyl phenol) | 3% | 2% | — | 4% | 3% | 3% | 3% | 4% | 5% |
| Product characteristics: | | | | | | | | | |
| DIBT-resistance | 1–5 7–14 | 1–5 7–14 | 1–5 7–14 | 1–5 7–14 | 1–5 7–14 | 1–5 7–14 | 1–14 | 1–14 | 1–14 |
| Static crack bridging 2 mm single layer coating (ages 4 d/60° C.) | <0.1 mm | <0.15 mm | <0.1 mm | <0.15 mm | <0.2 mm | <0.1 mm | ca. 0.8 mm | ca. 0.65 mm | ca. 0.55 mm |
| Shore D-hardness | 80 | 75 | 82 | 75 | 65 | 80 | 50 | 70 | 75 |

PACM bis-paraaminocyclohexylmethane
TETA triethylenetetramine
DDM diaminodiphenylmethane
DCH 99 1,2-diaminocyclohexane
IPDA 3-aminomethyl-3,5,5-trimethyl cyclohexylamine
MXDA m-xylylenediamine
BAC 1,3-bis(aminomethyl)cyclohexane)

7. Coating agent according to claim 1, characterized in that the extender of component A and/or B is selected from the group consisting of benzyl alcohol, xylene formaldehyde condensation products, coal-tar-resins, diisopropylnaphthalene, and mixtures thereof.

8. Coating agent according to claim 1, characterized in that the component B contains tertiary amines as an accelerator in an amount of up to 10% by weight.

9. Coating agent according to claim 1, characterized in that the component B contains an amine selected from the group consisting of bis-paraaminocyclohexylmethane, 3-aminomethyl-3,5,5-trimethyl cyclohexylamine, triethylenetetramine, diaminodiphenylmethane, 1,3-bis(aminomethyl)cyclohexane, 2,5-bis(aminomethyl)bicyclo(2.2.1)heptane, 2,6-bis(aminomethyl)bicyclo(2.2.1)heptane, 1,2-diaminocyclohexane and mixtures thereof, up to 50% by weight in relation to the total amine content.

10. Coating agent according to claim 1, characterized in that it contains components A and B in the molar ratio 1:1.

11. Coating agent according to claim 1, characterized in that it contains mineral aggregates with a particle size up to 3.0 mm, up to the 15-fold cumulative weight of components A and B.

12. Method of using a coating agent as claimed in claim 1 for surface coating of asphalt mastic as well as of mechanically and/or heavily chemically loadable backgrounds based on cement.

13. Method of using a coating agent according to claim 12 for coating of cement-bound foundations in layer thicknesses up to 50 mm.

14. Method of using a coating agent as claimed in claim 1 for elastic bridging of cracks.

15. Coating agent according to claim 8 wherein said accelerator is 2,4,6-trimethyl aminomethyl phenol.

16. Coating agent according to claim 11 wherein said mineral aggregate is pre-dried quartz sand.

17. Method according to claim 13 wherein said layer thickness is about 2 to 4 mm.

* * * * *